Jan. 7, 1964

W. LASAR 3,116,768

BAND SAW GUIDE

Filed May 7, 1962

INVENTOR.
WILLIAM LASAR
BY Fulwider Mattingly Huntley

ATTORNEYS

United States Patent Office 3,116,768
Patented Jan. 7, 1964

3,116,768
BAND SAW GUIDE
William Lasar, 2540 E. 114th St., Los Angeles, Calif.
Filed May 7, 1962, Ser. No. 192,864
8 Claims. (Cl. 143—160)

The present invention relates to a guide for saw blades which automatically corrects any tendency toward deflection of the blade and returns it to its proper path of movement.

The guide according to the present invention is particularly adapted for use with band saw blades to prevent twisting of the blade and to automatically maintain it with the plane of the blade parallel to the direction of movement of the work being sawed. At the same time, the guide engages and backs up the rear edge of the saw blade so as to prevent movement bodily of the blade out of its path of movement by pressure of the work piece thereon.

The operation of the guide is such that any tendency toward deflection of the cutting edge of the blade, such as might result from twisting of the blade relative to its normal path of movement, imediately produces a counteracting movement of the back edge of the blade to maintain the cutting edge thereof in its normal position and to maintain the plane of the blade in its proper relation parallel to the direction of progression of the work piece.

It is, therefore, an object of the present invention to provide an improved saw blade guide which will automatically maintain the saw blade in its normal path of movement.

Another object of this invention is an improved saw guide for automatically maintaining the plane of the saw blade parallel to the direction of movement of the work and piece and providing for immediate automatic return of the plane of the blade to its normal path in response to any momentary deflection of the cutting edge of the blade.

A further object of this invention is the provision of an improved saw blade guide automatically maintaining the saw in its normal path of movement and immediately compensating for any momentary deflection of the blade, and providing for transverse compensating movement of the back edge of the blade while at the same time backing up the back edge against movement bodily out of its normal path of movement.

A still further object of the present invention is the provision of an improved saw blade guide, including pivoted arms having portions engaging the saw blade adjacent its cutting and back edges and providing for immediate automatic transverse movement of the back edge of the blade to compensate for any momentary transverse deflection of the cutting edge of the blade.

These and other objects and features of the invention will be readily apparent to those skilled in the art from the following specification and appended drawing, in which:

FIGURE 1 is a perspective view of a saw blade guide in accordance with the present invention;

FIGURE 2 is a bottom plan view of the saw blade guide according to the present invention; and FIGURE 3 is a view similar to FIGURE 2 and showing an exaggerated, unrealistic deflection condition.

The saw blade guide according to the present invention, indicated generally at 11, includes a top plate 12 having an integral side flange 13 for connection to a band saw frame, as by a guide tongue 14 and screw holes 15. The top plate 12 is provided with a front opening, inwardly directed slot 16, within which the rear portion of the band saw blade 10 is disposed, and the arms 17 and 18 at opposite sides of the slot 16 are provided with face plates 19 and 21, respectively. The opposed faces of the plates 19 and 21 terminate in saw blade engaging toes 22 and 23, respectively, which are separated just sufficiently to provide clearance space for the passage of the saw blade 10 therebetween.

The cutting edge of the blade 10 is designated 24, and its rear edge 25. Rigidly supported by and depending from the top plate 12 are three posts 26, 27 and 28. A pair of outside arms 29 and 31 are pivotally mounted on the posts 26 and 27, respectively, at points intermediate the opposite ends thereof. Upon the front faces of the arms 29 and 31 are mounted plates 32 and 33, respectively, whose opposed faces terminate in toes 34 and 35 disposed adjacent the cutting edge 24 of the blade 10 and separated just sufficiently to provide clearance for movement of the blade therebetween. In the rear portions of the arms 29 and 31 are mounted opposed, adjustable abutment screws 36 and 37.

An arm 38 is disposed between the arms 29 and 31 and is pivotally mounted on the post 28 at a point intermediate its ends. In the forward face of the arm 38 there is provided a notch 39 within which rides the rear edge 25 of the blade 10, so that the walls defining the notch not only control the position of the rear edge of the saw blade laterally, but also back up the blade to prevent movement thereof bodily in the plane of the blade. The rear end of the arm 38 is provided with a generally cylindrical portion 41 disposed between and engaged by the abutment screws 36 and 37.

The operation of the guide according the the present invention in maintaining the saw blade in its proper path of movement will be understood from a consideration of FIGURE 3, which is an unrealistic and exaggerated representation of a deflected saw blade. The condition of FIGURE 3 can occur only when the abutment screws 36 and 37 are improperly adjusted, so as to allow too great a spacing therebetween; and this improper adjustment is illustrated by the spacing at 42 between the abutment screw 36 and the tubular portion 41 on the arm 38.

From FIGURE 3 it will be seen that as the cutting edge 24 of the blade 10 is deflected downwardly, the blade pivots substantially about the toe 23 on the stationary plate 21, thus moving the back edge 25 of the blade and the front portion of the arm 38 upwardly, as viewed in FIGURE 3, and actually to the right in the proper location of the apparatus as in FIGURE 1. As the cutting edge 24 of the blade 10 moves downwardly in FIGURE 3, it must move the toe 35 and plate 33 therewith, so that the arm 31 tends to rotate in a clockwise direction. Such rotational tendency also tends to move the adjustment pin 37 upwardly, and therewith the back end of the arm 38 which it engages. This tendency for upward or clockwise movement of the abutment pin 37 thus tends to rotate the arm 38 also in a clockwise direction, to move the notch 39 and the back edge of the blade 10 downwardly to return the blade to its regular path of movement as shown in FIGURE 2. As a matter of fact, with the abutment screws 36 and 37 properly adjusted, the space 42 can never occur; and any tendency for the cutting edge of the blade 10 to deflect upon twisting of the blade 10 is immediately counteracted, since any tendency for rotation of either of the arms 29, 31 is immediately counteracted by the tendency of the arm 38 to rotate in the same direction, to thereby provide lateral control of the back edge 25 of the blade to resist any tendency toward twisting of the blade. Therefore, any lateral force at the front edge of the cutting blade is immediately counteracted by a like force on the back edge of the blade in the same direction. This results in equal and opposite rotational moments on the blade about one or the other of the abutment toes 22 and 23 fixed on the stationary plate 12.

Not only does the arm 38 immediately apply a reverse rotational moment to prevent twisting of the saw blade 10 by controlling the position of the back edge 25 of the blade disposed in the notch 39, but the bottom of this notch limits the rearward movement of the blade 10 in its own plane and therefore backs up and reinforces the blade against edgewise forces applied thereto by the work piece.

It will therefore be seen that the saw blade guide according to the present invention provides a very simple but effective means for maintaining the blade of a saw, such as a band saw, in its normal path of movement, prevents deflection of the cutting edge of the saw and twisting of the saw blade out of its normal plane and path, and backs up the saw blade against edgewise forces.

The means for retaining the arms 29, 31 and 38 on the posts 26, 27 and 28, respectively, has been removed from the drawing for the sake of clarity, but it will be understood that such means will normally be provided and may be individual to the arms or may be a common plate extending across the end faces of the posts.

While a certain preferred embodiment of the invention has been specifically illustrated and described, it will be understood that the invention is not limited thereto, as many variations will be apparent to those skilled in the art, and the invention is to be given its broadest interpretation within the terms of the following claims.

I claim:

1. A saw blade guide comprising: a pair of independently rotatable arms pivotally mounted intermediate their ends and carrying opposed abutment toes adjacent their front ends disposed adjacent the cutting edge of the blade on opposite sides thereof and having clearance therebetween for free passage of the blade; a third arm disposed between said pair of arms and pivoted intermediate its ends and having means at its front end engageable with the rear edge of said blade to control the lateral position of said rear edge; and means interconnecting the rear ends of said three arms so that rotation of either of the pair of arms requires rotation of the third arm therewith.

2. A saw blade guide comprising: a pair of stationary guide toes disposed on opposite sides of the saw blade and intermediate the front and back edges thereof and having clearance therebetween for free passage of the saw blade; a pair of independently rotatable arms pivotally mounted intermediate their ends and carrying opposed abutment toes adjacent their front ends disposed adjacent the cutting edge of the blade on opposite sides thereof and having clearance therebetween for free passage of the blade; a third arm disposed between said pair of arms and pivoted intermediate its ends and having means at its front end engageable with the rear edge of said blade to control the lateral position of said rear edge; and means interconnecting the rear ends of said three arms so that rotation of either of the pair of arms requires rotation of the third arm therewith.

3. A saw blade guide comprising: a pair of stationary guide toes disposed on opposite sides of the saw blade and intermediate the front and back edges thereof and having clearance therebetween for free passage of the saw blade; a pair of independently rotatable arms pivotally mounted intermediate their ends and carrying opposed abutment toes adjacent their front ends disposed adjacent the cutting edge of the blade on opposite sides thereof and having clearance therebetween for free passage of the blade; a third arm disposed between said pair of arms and pivoted intermediate its ends and having means at its front end engageable with the rear edge of said blade to control the lateral position of said rear edge; and opposed abutment means at the rear ends of said pair of arms disposed on opposite sides of and engageable with the rear end of said third arm.

4. A saw blade guide comprising: a pair of stationary guide toes disposed on opposite sides of the saw blade and intermediate the front and back edges thereof and having clearance therebetween from free passage of the saw blade; a pair of independently rotatable arms pivotally mounted intermediate their ends and carrying opposed abutment toes adjacent their front ends disposed adjacent the cutting edge of the blade on opposite sides thereof and having clearance therebetween from free passage of the blade; a third arm disposed between said pair of arms and pivoted intermediate its ends and having means at its front end engageable with the rear edge of said blade to control the lateral position of said rear edge; opposed, adjustable abutment screws at the rear ends of said pair of arms; and abutment means at the rear end of said third arm disposed between and engageable by said abutment screws.

5. A saw blade guide comprising: a pair of stationary guide toes disposed on opposite sides of the saw blade and intermediate the front and back edges thereof and having clearance therebetween for free passage of the saw blade; a pair of independently rotatable arms pivotally mounted intermediate their ends and carrying opposed abutment toes adjacent their front ends disposed adjacent the cutting edge of the blade on opposite sides thereof and having clearance therebetween for free passage of the blade; a third arm disposed between said pair of arms and pivoted intermediate its ends and having means at its front end engageable with the rear edge of said blade to control the lateral position of said rear edge; and means interconnecting the rear ends of said three arms so that rotation of either of the pair of arms requires rotation of the third arm therewith, whereby any tendency for deflection of the cutting edge of the saw blade is transmitted through one of the pair of outside arms to the third arm to apply a counteracting force to the back edge of the blade.

6. A saw blade guide comprising: a pair of stationary guide toes disposed on opposite sides of the saw blade and intermediate the front and back edges thereof and having clearance therebetween for free passage of the saw blade; a pair of independently rotatable arms pivotally mounted intermediate their ends and carrying opposed abutment toes adjacent their front ends disposed adjacent the cutting edge of the blade on opposite sides thereof and having clearance therebetween for free passage of the blade; a third arm disposed between said pair of arms and pivoted intermediate its ends and having means at its front end engageable with the rear edge of said blade to control the lateral position of said rear edge; and means interconnecting the rear ends of said three arms so that rotation of either of the pair of arms requires rotation of the third arm therewith, whereby any tendency for deflection of the cutting edge of the saw blade is transmitted through one of the pair of outside arms to the third arm to apply a counteracting force to the back edge of the blade, the deflecting force at the cutting edge of the blade being applied in the same direction but producing opposite rotational moments about a fixed guide toe intermediate the edges of the blade.

7. A saw blade guide comprising: a pair of independently rotatable arms pivotally mounted intermediate their ends and carrying opposed abutment toes adjacent their front ends disposed adjacent the cutting edge of the blade on opposite sides thereof and having clearance therebetween for free passage of the blade; a third arm disposed between said pair of arms and pivoted intermediate its ends, the front face of said third arm having a notch therein receiving the rear edge of said blade to control the lateral position of said rear edge and backing up the rear edge to reinforce the blade against edgewise forces thereon; opposed, adjustable abutment screws at the rear ends of said pair of arms; and abutment means at the rear end of said third arm disposed between and engageable by said abutment screws.

8. A saw blade guide comprising: a pair of stationary guide toes disposed on opposite sides of the saw blade and intermediate the front and back edges thereof and having clearance therebetween for free passage of the saw blade; a pair of independently rotatable arms pivotally mounted intermediate their ends and carrying opposed abutment toes adjacent their front ends disposed adjacent the cutting edge of the blade on opposite sides thereof and having clearance therebetween for free passage of the blade; a third arm disposed between said pair of arms and pivoted intermediate its ends, the front of face of said third arm having a notch therein receiving the rear edge of said blade to control the lateral position of said rear edge and backing up the rear edge to reinforce the blade against edgewise forces thereon; and opposed, adjustable abutment means at the rear ends of said pair of arms engageable with the rear end of said third arm to transmit to the back edge of the blade a lateral force counteracting any deflecting force at the cutting edge of the blade, said deflecting and counteracting forces producing opposite rotational moments about a fixed guide toe.

References Cited in the file of this patent
UNITED STATES PATENTS

| | | |
|---|---|---|
| 1,725,089 | Lemmer | Aug. 20, 1929 |
| 2,914,100 | Lindholm | Nov. 24, 1959 |